United States Patent
Gray et al.

(10) Patent No.: US 11,030,612 B2
(45) Date of Patent: Jun. 8, 2021

(54) METHOD AND SYSTEM FOR DYNAMICALLY INTERACTIVE VISUALLY VALIDATED MOBILE TICKETING

(71) Applicant: MOOVEL NORTH AMERICA, LLC, Austin, TX (US)

(72) Inventors: Michael Gray, Portland, OR (US); Nathaniel Parker, Portland, OR (US); Zachary Babb, Portland, OR (US); Alexandra Peter, Portland, OR (US)

(73) Assignee: moovel North America LLC, Portland, OR (US)

( * ) Notice: Subject to any disclaimer, the term of this patent is extended or adjusted under 35 U.S.C. 154(b) by 418 days.

(21) Appl. No.: 15/785,365

(22) Filed: Oct. 16, 2017

(65) Prior Publication Data
US 2018/0053175 A1 Feb. 22, 2018

Related U.S. Application Data (63) Continuation of application No. 14/577,915, filed on Dec. 19, 2014, now Pat. No. 9,792,604.

(51) Int. Cl.
*G06Q 20/32* (2012.01)
*G06Q 20/04* (2012.01)
*G06Q 20/36* (2012.01)

(52) U.S. Cl.
CPC ....... *G06Q 20/3274* (2013.01); *G06Q 20/045* (2013.01); *G06Q 20/047* (2020.05); *G06Q 20/0457* (2013.01); *G06Q 20/363* (2013.01)

(58) Field of Classification Search
CPC .............................. G06Q 10/02; G06Q 10/00
USPC .............................................................. 705/5
See application file for complete search history.

(56) References Cited

U.S. PATENT DOCUMENTS

| | | | | |
|---|---|---|---|---|
| 9,747,558 | B2 * | 8/2017 | Parikka | G06Q 10/02 |
| 2007/0259716 | A1 * | 11/2007 | Mattice | G06F 3/013 463/36 |
| 2007/0259717 | A1 * | 11/2007 | Mattice | A63F 3/00157 463/36 |
| 2008/0146344 | A1 * | 6/2008 | Rowe | G07F 17/32 463/42 |
| 2015/0006385 | A1 * | 1/2015 | Shah | G06Q 20/322 705/44 |
| 2015/0193702 | A1 * | 7/2015 | Grbavac | G06Q 10/02 705/51 |
| 2015/0356466 | A1 * | 12/2015 | Parikka | G06Q 10/02 705/5 |
| 2016/0062473 | A1 * | 3/2016 | Bouchat | G06F 3/017 345/156 |

(Continued)

*Primary Examiner* — Oluseye Iwarere
(74) *Attorney, Agent, or Firm* — Jones Day (57) ABSTRACT

Systems and methods for interaction-based validation of electronic tickets. In some embodiments, the system renders a first visually illustrative scene on an interactive display screen of a mobile device, the first visually illustrative scene responsive to a pre-determined gesture performed at a predetermined location on the interactive display screen. Upon a user interacting with the first visually illustrative scene, an app on the user's mobile device extracts user interaction information. In response to determining that the user interaction information matches with a pre-determined gesture performed at the predetermined location, the system renders a second visually illustrative scene on the interactive display screen of the mobile device.

22 Claims, 6 Drawing Sheets

(56) References Cited

U.S. PATENT DOCUMENTS

| | | | |
|---|---|---|---|
| 2016/0180326 A1* | 6/2016 | Gray | G06Q 20/045 705/23 |
| 2017/0236372 A1* | 8/2017 | Bulzacki | G07F 17/32 463/43 |
| 2017/0323228 A1* | 11/2017 | Parikka | G06Q 10/02 |
| 2019/0303808 A1* | 10/2019 | Konstam | G06Q 20/045 |

* cited by examiner

METHOD AND SYSTEM FOR DYNAMICALLY INTERACTIVE VISUALLY VALIDATED MOBILE TICKETING

CROSS-REFERENCE TO RELATED APPLICATIONS

This disclosure incorporates by reference the disclosure provided in U.S. Patent Application Publication No. 20140095227. The disclosure in U.S. Patent Application Publication No. 20140095227 is exemplary of systems or methods for visually validated ticketing that can be enhanced in accordance with the disclosure provided herein.

TECHNICAL FIELD

The present disclosure relates generally to systems and methods for electronic ticketing. More specifically, embodiments of the present disclosure relate to systems and methods for interaction-based validation of electronic tickets.

BACKGROUND AND SUMMARY

Historically, consumers verify that they previously purchased a fare or a pass for transit or a right for admission to a show, performance, or an event by presenting a physical representation of that purchase, commonly referred to as a ticket. Over time, physical tickets have evolved to contain additional security features, such as holograms, QR codes, security codes, etc. Such tickets, however, typically require an electronic validation procedure. For example, when a ticket containing an electronic security feature such as a QR code is brought in close proximity to a QR reader, the QR reader can validate the ticket. But this type of validation can be time consuming, cumbersome, and challenging to implement in many scenarios where timeliness is critical. For instance, in the context of public transit systems, ticketing for movies, shows, sporting events, or event parking systems, it is preferred that the validation procedure be less complicated and faster for consumers.

With the advent of mobile devices, validation of mobile tickets can involve a user's (ticket holder's) mobile device. Accordingly, an approach of validating electronic tickets using a user's mobile device is discussed herein. This approach is designed using multiple items of interactive digital content. The mobile ticket validation involves a user to interact with one or more items of digital content presented on a user's mobile device. These and several other aspects, features, and benefits of the present systems and methods will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION

Embodiments of the present disclosure generally relate to systems and methods for creating and managing mobile ticket validation using a user's (ticket holder's) mobile device. In known systems, a user can validate a ticket by triggering the user's mobile device to generate a display intended to be shown to a ticket-taker, or inspector. The display can be a depiction of a conventional paper ticket or it can be a visually illustrative scene, an animation, or a message or other audio indicating successful validation of an electronic ticket. Upon viewing the display, the ticket-taker can discern that the mobile device user has already purchased a ticket and intends to redeem it.

Various measures can be taken to prevent or at least discourage a mobile device user from generating a counterfeit display. For example, the ticketing data used by the mobile device to generate the display can be encrypted, downloaded from a server at the moment that the user is redeeming the ticket, or dynamically generated by the mobile device based upon a combination of data downloaded previously and the particular time and date that the user elects to redeem the ticket. Nonetheless, there remains at least some risk that mobile device users will devise counterfeit tickets. Accordingly, the inventive validation process as described herein incorporates interactive digital content to further ensure that the ticket being validated is authentic.

In accordance with various embodiments of the invention, a mobile device is configured to enable a user or a ticket taker to validate a ticket by interacting with one or more items of digital content presented on the user's mobile device touchscreen display. For example, the ticket-taker may reach over and tap the display of the user's mobile device to trigger additional or altered content to be displayed. A mobile application running on a user's mobile device causes the device to display a first graphically illustrative scene on a touchscreen graphical user interface (GUI) display of the mobile device, followed by a second graphically illustrative scene presented in response to (i.e., triggered by) physical interaction (either by the mobile device user or by the ticket taker) with the display of the first visually illustrative scene. The mobile application (app) running on the user's mobile device detects interaction with the mobile device. Examples of interactions (without any limitations) can include various finger-operated gestures, like a tap, a scroll, a swipe, etc. on the mobile device touchscreen display. If the mobile app determines that there has been interaction with the first item of digital content, then, at least in some embodiments, a second item of digital content is then presented on the display.

In some embodiments of the present invention, the mobile app determines whether the interaction with a mobile device's display (more specifically, the displayed first item of digital content) satisfies certain conditions. These conditions can be associated with context such as the time of day, day of the week, or location where the mobile device is validating the ticket. Additionally or alternatively, the conditions may be determined according to the type of a mobile device or an operating system running on the mobile device. The conditions may require that the touchscreen is tapped or swiped at a certain area of the display (e.g., at the top) to trigger the second item of digital content.

For example, the mobile app may be configured to trigger display of a second graphic only upon detecting a tap (i) on the upper left corner of the touchscreen during the morning hours, and (ii) on the lower right corner of the touchscreen during the afternoon hours. The app configures the mobile device to determine if the interaction is of a specific type. As another example, a condition might require that the interaction be a swipe right on a first visually illustrative scene. Only a right swipe will cause the first visually illustrative scene to change into a second visually illustrative scene. In such a scenario, other types of interaction will not cause the first visually illustrative scene to change into a second visually illustrative scene.

If a condition requires a certain location on the screen of the mobile device where an interaction is to occur for successful validation, it may be determined by pixel area. For example, a condition can specify that an interaction (e.g., a single tap) has to occur within a 200 pixel by 200 pixel display area in the top right corner of a screen of a mobile device.

Data pertaining to conditions required for ticket validation can be transmitted by a remote ticketing server to the app running on the mobile device. The ticketing server can transmit this data at the time a user is purchasing a ticket, redeeming it, or at both times. In some embodiments, new conditions can be transmitted or previously transmitted conditions can be updated at any time, i.e., regardless of the time when the user is purchasing and/or redeeming an electronic ticket. Additionally, in some embodiments, these conditions can be specified by a service provider associated with the ticket. Such conditions can be, for example, configured in a spritesheet or a data file installed on a user's mobile device. In some embodiments, when the mobile application is downloaded, a spritesheet or data file is also downloaded along with or as part of the mobile application. A spritesheet can include ticket images, animation, text, graphics, conditions associated with interacting with the touchscreen for validation (such as predetermined locations on a touch screen for receiving interaction), etc. The data embedded in a spritesheet may be used during a validation process. In some scenarios, a spritesheet may be encrypted to prevent unauthorized access to the images used in validation.

In some embodiments, upon successful validation, the app displays a message indicating successful validation of an electronic ticket on the screen of a mobile device. The app also may be configured to transmit information from the mobile device to a ticketing server indicating successful validation of an electronic ticket. The ticketing server can then update inventory associated with purchase and validation of an electronic ticket. In some embodiments, the ticketing server may communicate with a financial institution linked to a user account to debit a monetary amount associated with the purchase and validation of an electronic ticket.

Various aspects and examples of the embodiments will now be described. The following description provides specific details for a thorough understanding and enabling description of these examples. One skilled in the art will understand, however, that the embodiments may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below, however, any terminology intended to be interpreted in any restricted manner will be overtly and specifically defined as such in this Detailed Description section.

Figure 1:
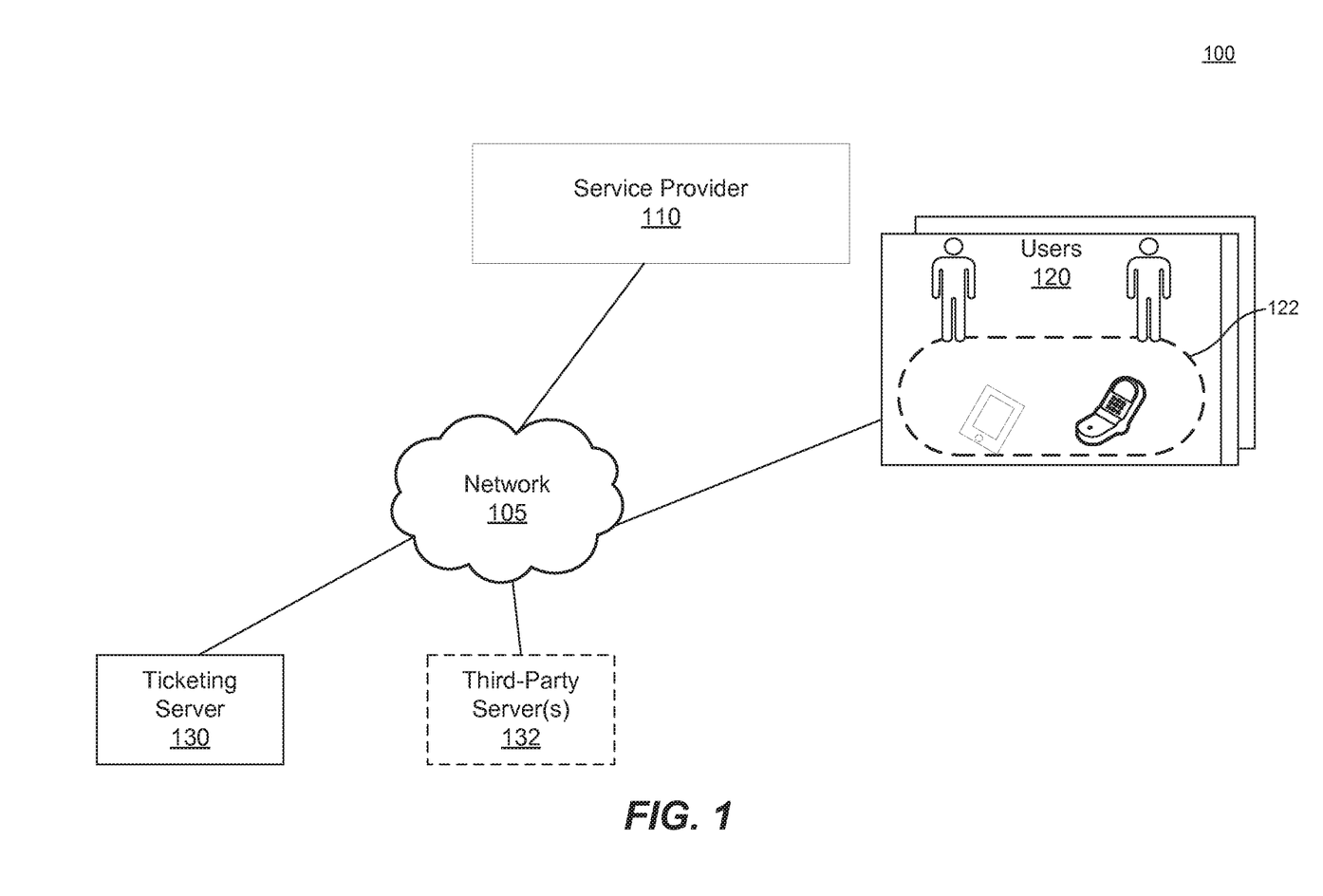
FIG. 1 illustrates a diagram of an exemplary system in which a ticketing server facilitates validation of electronic tickets of users with mobile devices.

FIG. 1 illustrates a diagram of an example system 100 where a ticketing server 130 facilitates mobile ticket validation involving a user's mobile device. A ticketing server is connected via one or more networks 105 to users 120, service providers 110, and one or more third party servers 132. Users 120 own, operate, or otherwise have access to mobile devices 122. Examples of mobile devices include but are not limited to tablets, mobile smart phones, personal digital assistants, wearable consumer devices, etc. These mobile devices can run, for example, the popularly-known ANDROID™, IPHONE™, and WINDOWSPHONE™ platforms. It will be understood that there is no limitation imposed on the number of mobile devices, mobile device types, brands, vendors and manufacturers that may be used with embodiments of the present disclosure.

A server designed and constructed in accordance with aspects of the present disclosure is referred to herein as a ticketing server 130. It will be understood that the term "ticketing server" can be a single server or a plurality of interconnected servers that are configured to exchange information. Further, such a server or a plurality of servers can be cloud-based or can be physical servers.

The tickets can be associated with a service, show, transit, activity, etc. offered or provided by service providers 110. For example, service providers 110 can include transit agencies, parking agencies, movie theaters, entertainment agencies, merchants, stores, and the like. For purposes of this disclosure, the term "service provider" will be used to denote both product providers as well as service providers 110. Service providers 110 can, in some embodiments, configure various conditions and parameters of a validation process.

In some scenarios, a service provider 110 might opt to have a third party handle the financial transactions associated with electronic ticketing. Thus, as shown in FIG. 1, third party server(s) 132 can include the user's financial institution (for billing the user for purchase of a ticket). Third party server(s) may be comprised of one entity or possibly multiple entities.

Electronic data communications between elements shown in FIG. 1 can be achieved via one or more networks 105, such as, but not limited to, a Local Area Network (LAN), Wireless Local Area Network (WLAN), Personal area network (PAN), or wireless wide area network (WWAN), enabled with technologies such as Global System for Mobile Communications (GSM), Personal Communications Service (PCS), Bluetooth, Fixed Wireless Data, 2G, 2.5G, 3G, 3G LTE, LTE Advanced, 4G, general packet radio service (GPRS), messaging protocols such as, TCP/IP, SMS, MMS, instant messaging, or any other wireless data networks or messaging protocols. Although not shown in FIG. 1, it can be further understood that such communications may include one or more secure networks, gateways, or firewalls that provide information security from unwarranted intrusions and cyber attacks. In some embodiments, the ticketing server 130 includes functionality to allow it to communicate, for example, by using application programming interfaces (APIs), with various elements shown in FIG. 1.

For purposes of example and explanation, it can be assumed that users 120 initially register, create an account or membership with an embodiment of the ticketing server 130. The registration (usually a one-time activity) can be accomplished in a conventional manner via a ticketing server user interface, or via a mobile device application program that communicates with the ticketing server 130. During registration, a user 120 and/or the mobile device may provide relevant information, such as an ID of a user, an ID of the mobile device, one or more credit/debit card numbers associated with a financial institution of the user for billing purposes, a phone number, an email address. Typically, as will be understood, information provided by system users during registration is stored in an exemplary ticketing server database associated with an embodiment of the ticketing server 130.

In some embodiments, a mobile device application program operating in conjunction with ticketing server 130 can handle electronic ticketing associated with multiple service providers 110. For example, a single mobile application program can handle tickets for multiple transit agencies in addition to parking passes from a different entity. Using the mobile application, a user can purchase electronic tickets (associated with a service provider 110) which are sent by the ticketing server 130 to the mobile device 122.

The validation process occurs when a purchased ticket is to be redeemed by a user 120. According to an aspect of the present disclosure, a validation process begins when a user 120 opens or otherwise accesses the ticketing serverapplication on the mobile device and elects to redeem a ticket. The ticketing serverapplication can be configured for the APPLE® IPHONE® and GOOGLE® ANDROID® mobile device operating systems, for allowing users to interact with items of digital content as part of an electronic ticket validation process. According to another aspect of the present disclosure, the ticketing server user interface can be configured as a web application accessible through a web browser. The ticketing server user interface detects that the user is electing to redeem the ticket (e.g., via a swipe on the mobile device) and generates one or more items of digital content (e.g., visually illustrative scenes) on the touch screen display. In some embodiments, upon successful validation, the mobile app displays a message on the mobile device indicating successful validation of an electronic ticket. In some embodiments, a mobile device sends a message (e.g., a confirmation) to the ticketing server 130 indicating successful validation of an electronic ticket.

The discussions above with regard to FIG. 1 merely provide an overview of an embodiment of the present system for validation of electronic tickets using multiple items of interactive digital content, and are not intended to limit in any way the scope of the present disclosure. Further, it will be understood that although the description (in FIG. 1 and that which follows below) is primarily discussed as the ticketing server 130 comprising a system that is separate and discrete from the service providers 110, embodiments of the disclosed ticketing server have broader applicability that allow the service providers 110 to host the ticketing server 130, or the ticketing server 130 to provide functional aspects of the service providers 110, in alternate embodiments of the present system. Accordingly, it will be understood and appreciated that in some embodiments, the ticketing server 130 and/or the service providers 110 may comprise a combined or unitary system. Various flowcharts of embodiments of the disclosed ticketing server will be described next in greater detail.

Figure 2:
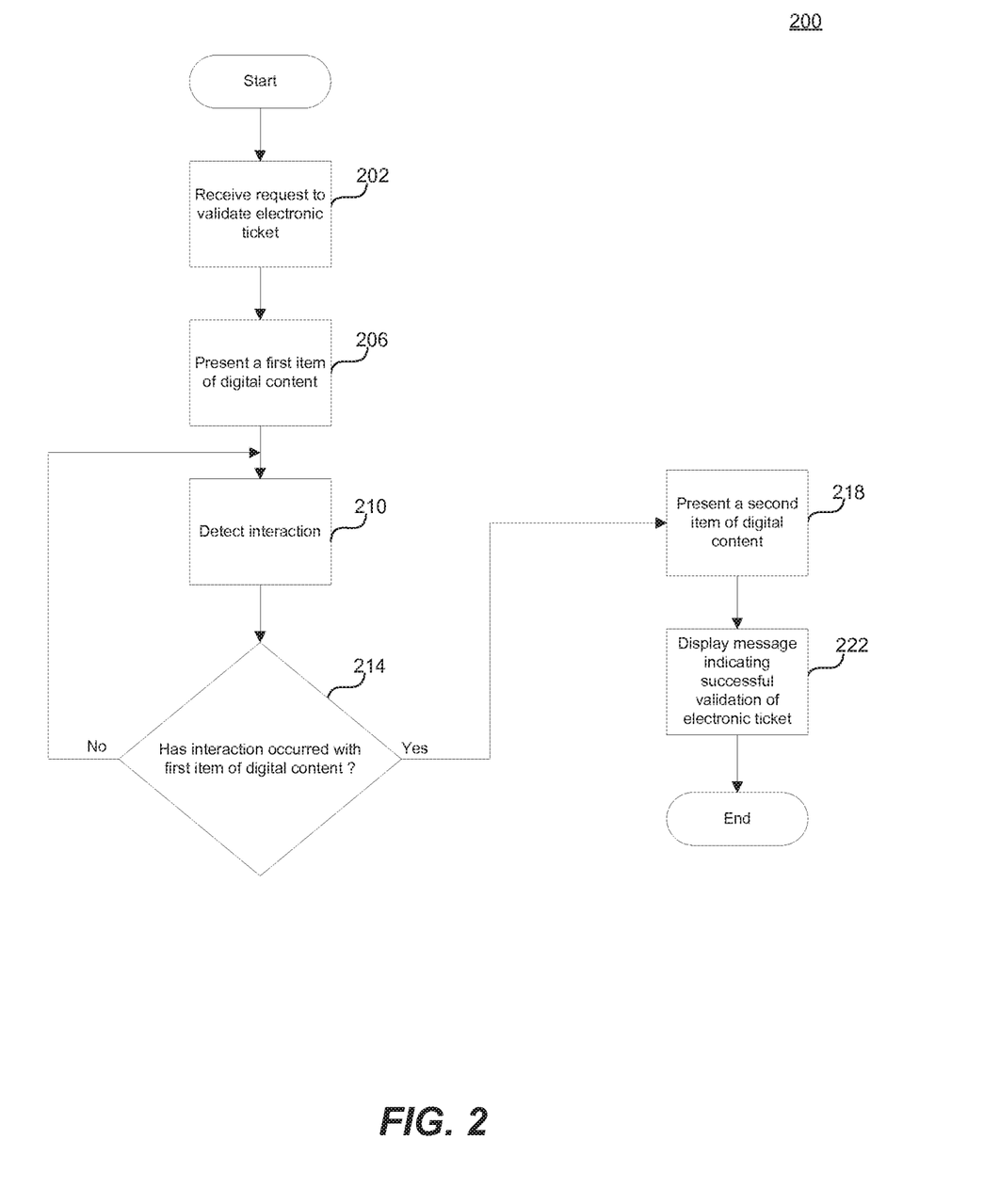
FIG. 2 illustrates a flow diagram showing method steps by a mobile app for validation of electronic tickets, according to an embodiment of the present invention.

FIG. 2 is a flow diagram of steps 200 performed by a mobile app for validating electronic tickets, according to an embodiment of the present invention. Specifically, steps shown in FIG. 2 are implemented by a ticketing server user interface associated with a mobile app running on a user's mobile device. Starting at step 202, a mobile app receives a request to validate an electronic ticket. Such a request usually comes from a user. However, in some scenarios, a request can come from a relative or a friend of a user. Alternatively, a request can also come from a ticket taker (e.g., of a transit agency) included as part of a validation process. At step 206, a first item of digital content is presented on the mobile device. Items of digital content can include audio content, video/image content, or a combination of the above. At step 210, a mobile app detects interaction with the first item of digital content via the mobile device. For example, a user listens to an audio fragment via headphones, or reviews a visually illustrative scene, or performs any kind of interaction.

Embodiments of the present disclosure allow for various types of interactions. For example, the interactions can be finger-operated gestures applicable to touch screen mobile devices. Mobile devices that incorporate a touch screen are generally configured to enable interaction or navigation on the device by tapping, scrolling, or making a pinching gesture on the surface of the screen. In accordance with an embodiment of the disclosure, these gestures are applied on digital content (e.g., visually illustrative scenes) to cause or effectuate a change in the displayed scenes. For example, a single tap gesture can cause a change of color to a part of a scene, or a whole scene. As another example, in response to a pinch gesture, an initially opaque background in a scene can change into a transparent background in a scene. Thus, embodiments of the present disclosure allow for various types of interactions that trigger changes in a scene in whole or in part.

It is noted that in embodiments of the present disclosure, interactions are not limited to tactile interactions such as involving finger-operated gestures on touch screen devices, but additionally can involve biometric detection, e.g., a user's eye movements, contactless hand gestures in the air, face detection, smile detection, or any other kind of detection. Accordingly, at step 214, the app determines whether or not interaction has occurred with a first item of digital content. If the mobile app determines that interaction has occurred with the mobile device, then it presents a second item of digital content, at step 218. In some embodiments, the mobile app displays (at step 222) a message on the mobile device indicating successful validation of an electronic ticket. This process terminates thereafter. However, if at step 214, the mobile app determines that interaction has not occurred with the first item of digital content, then it reverts back to step 210 and continues to wait for interaction to occur with the first item of digital content.

Figure 3:
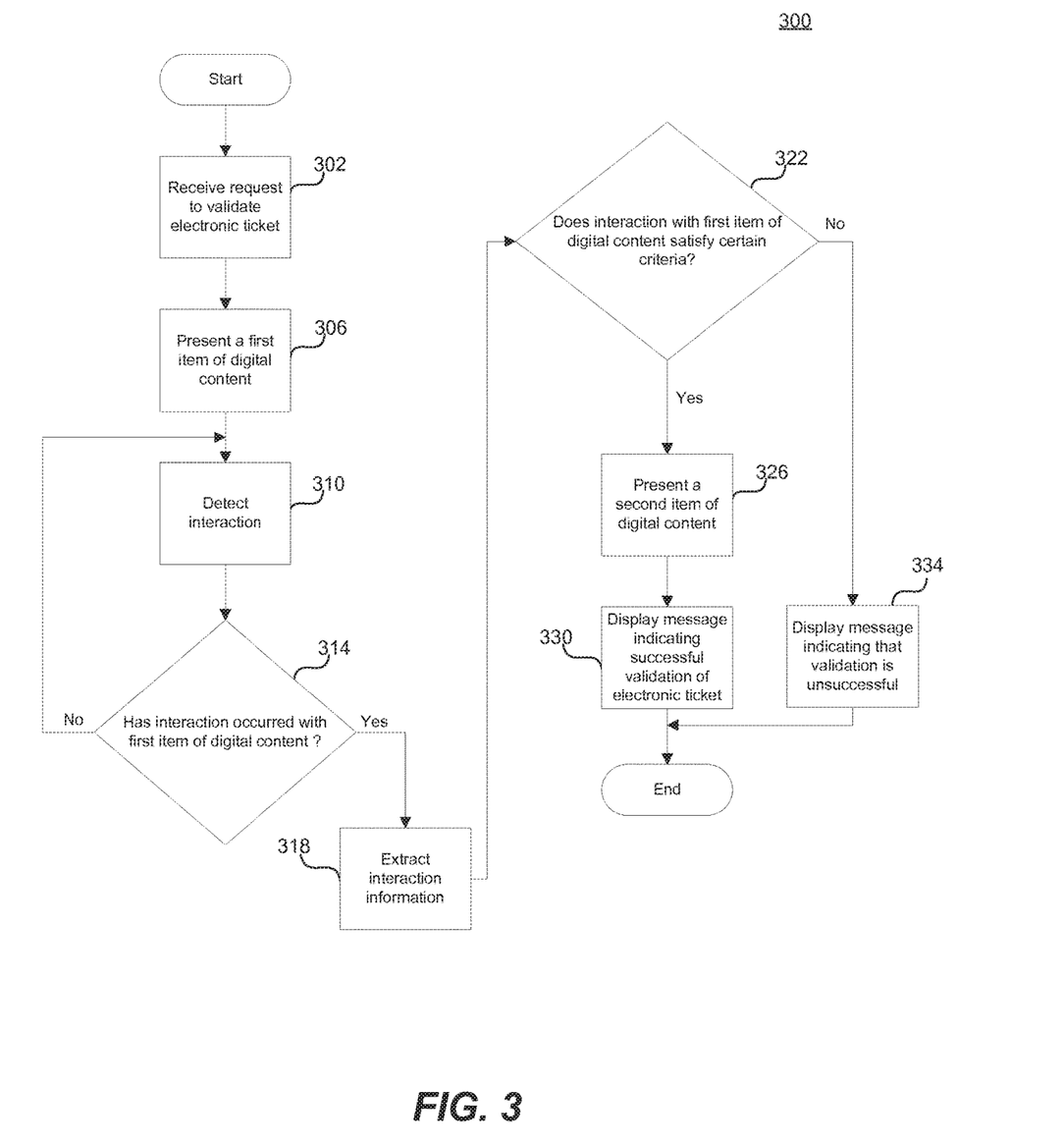
FIG. 3 illustrates a flow diagram showing method steps by a mobile app for validation of electronic tickets, according to an embodiment of the present invention.

FIG. 3 illustrates a flowchart showing method steps 300 implemented by a mobile app for validation of electronic tickets, according to an embodiment of the present invention. Specifically, the steps shown in FIG. 3 are implemented by a ticketing server user interface associated with a mobile app running on a user's mobile device. Starting at step 302, a mobile app receives a request to validate an electronic ticket. Such a request usually comes from a user. However, in many scenarios, a request can come from a relative or a friend of a user. Alternatively, a request can also come from a ticket taker (e.g., of a transit agency) included as part of a validation process. At step 306, a first item of digital content is presented on the mobile device. Items of digital content can include audio content, video/image content, or a combination of the above. At step 310, a mobile app detects an interaction with the first item of digital content via the mobile device. For example, a user listens to an audio fragment via headphones, or reviews a visually illustrative scene, or performs any kind of interaction.

Embodiments of the present disclosure allow for various types of interactions. For example, the interactions can be finger-operated gestures applicable to touch screen mobile devices. Mobile devices that incorporate a touch screen are generally configured to enable interaction or navigation on the device by tapping, scrolling, or making a pinching gesture on the surface of the screen. In accordance with an embodiment of the disclosure, these gestures are applied on digital content (e.g., visually illustrative scenes) to cause or effectuate a change in the displayed scenes. For example, a single tap gesture can cause a change of color to a part of a scene, or a whole scene. As another example, in response to a pinch gesture, an initially opaque background in a scene can change into a transparent background in a scene. Thus, embodiments of the present disclosure allow for various types of interactions that trigger changes in a scene in whole or in part.

It is noted that in embodiments of the present disclosure, interactions are not limited to tactile interactions that involve finger-operated gestures on touch screen devices, but additionally can involve biometric detection, e.g., eye movements, contactless hand gestures in the air, face detection, smile detection, or any other kind of detection. Thus, embodiments of the ticketing server mobile app is able to communicate with various detection sensors, software (e.g., mobile device operating system, other apps running or installed on the mobile device) and hardware in order to extract information associated with interaction.

Accordingly, at step 314, the app determines whether or not an interaction has occurred with a first item of digital content. If the mobile app determines that an interaction has occurred with the mobile device, then it extracts interaction information, at step 318. However, if at step 314, the mobile app determines that the interaction with the first item of digital content has not occurred, then it reverts back to step 310 and continues to wait for the interaction to occur with the first item of digital content.

At step 322, the mobile app determines if an interaction with the first item of digital content satisfies certain conditions (or, criteria). Such conditions can be communicated by a ticketing server 130 at the time a user is seeking validation of a mobile ticket. Alternatively, such conditions (typically represented as JSON strings for computer-programming purposes) can be communicated at any point in time as periodic or intermittent updates, as necessary. If the mobile app determines (at step 322) that interaction with the first item of digital content does not satisfy certain conditions, then, in some embodiments, the mobile app displays (at step 334) a message indicating that validation is unsuccessful. The process terminates thereafter.

However, if the mobile app determines (at step 322) that the interaction with the first item of digital content satisfies certain conditions, then the mobile app presents (at step 326), a second item of digital content. In some embodiments, the mobile app also displays (at step 330) a message indicating that validation is successful. The process terminates thereafter.

Figure 4:
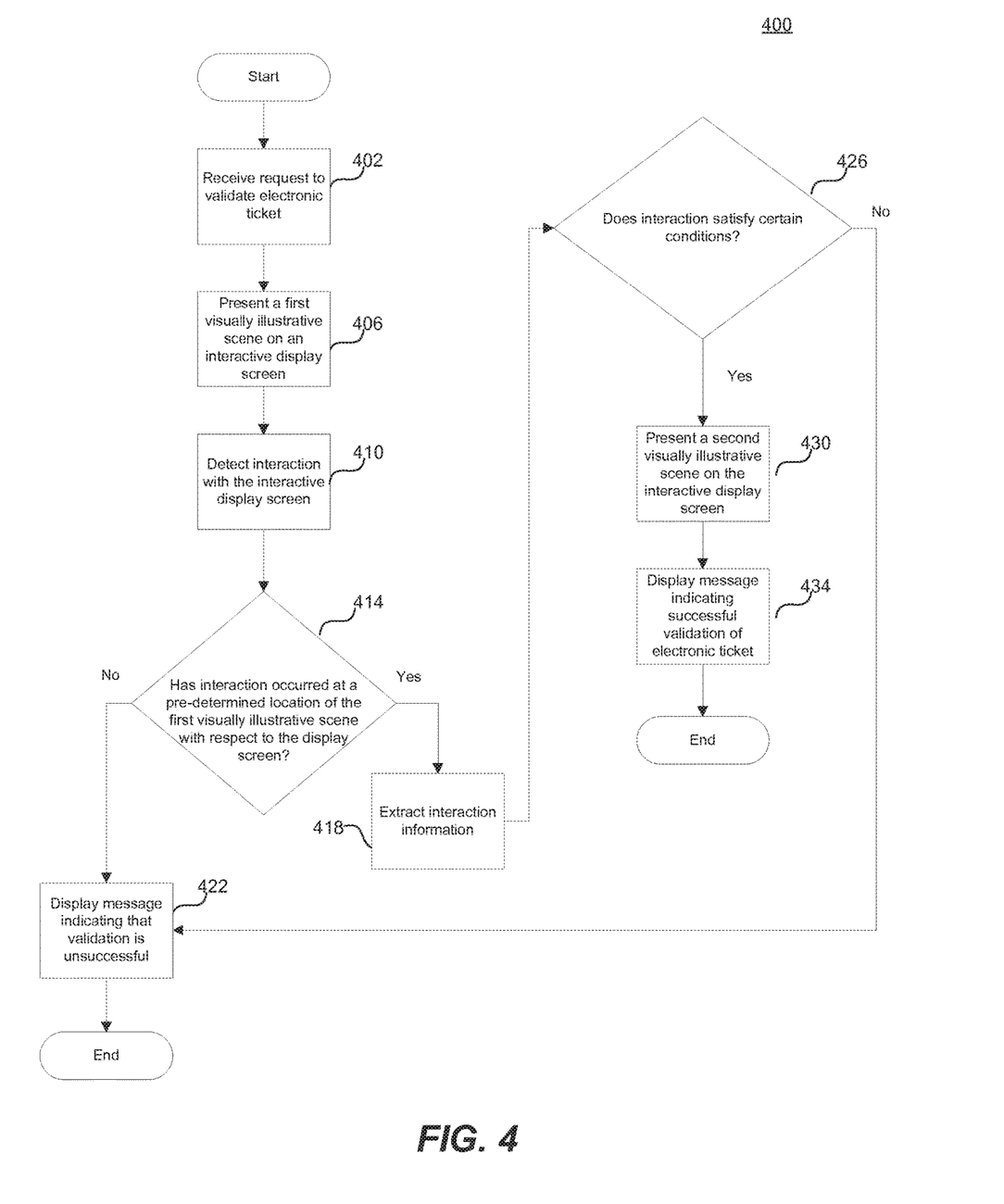
FIG. 4 illustrates a flow diagram showing method steps by a mobile app for validation of electronic tickets, according to an embodiment of the present invention.

FIG. 4 illustrates a flowchart showing method steps 400 implemented by a mobile app for validation of electronic tickets, according to an embodiment of the present invention. The flowchart in FIG. 4 is directed at an embodiment wherein the digital content used as a part of a validation process includes visually illustrative scenes displayed on a screen of a mobile device. Starting at step 402, a mobile app receives a request to validate an electronic ticket. Such a request usually comes from a user. However, in many scenarios, a request can come from a relative or a friend of a user. Alternatively, a request can also come from a ticket taker (e.g., of a transit agency) included as part of a validation process. At step 406, a first visually illustrative scene is presented on the mobile device. At step 410, a mobile app detects interaction with the first visually illustrative scene via the screen of the mobile device. For example, an interaction can be a scroll, a pinch, a tap, a press, or any other kind of interaction.

At step 414, the mobile app determines whether or not an interaction with the first visually illustrative scene has occurred at a predetermined location with respect to the display screen. In an exemplary scenario (refer to FIG. 6A), a condition can specify that an interaction is supposed to be a single long press and with a chimney located within a 200 pixel by 200 pixel display area in the top right corner of a screen of a mobile device. Accordingly, in some embodiments, if an interaction has not occurred at the predetermined location, then the mobile app displays (at step 422) a message on the screen of the mobile device indicating that validation is unsuccessful. (It will be understood that the discussions in connection with FIG. 4 are for illustrative purposes only. In embodiments of the present disclosure, the predetermined location wherein interaction is supposed to occur can be of any size and can be located anywhere on the screen of a mobile device.)

If the mobile app determines that an interaction has occurred at the predetermined location, then the mobile app extracts interaction information at step 418. The interaction information can be extracted first by the operating system running on the user's mobile device and then provided to the mobile app, upon request. In alternate embodiments, the mobile app directly extracts interaction information from the touch screen of the user's mobile device. Next, at step 426, the mobile app determines (from the interaction information) whether or not the interaction satisfies certain conditions. In other words, successful validation depends on whether certain conditions are satisfied. These conditions can be associated with a context such as a time of the day, a day of the week, a location of the mobile device, a type of a mobile device, an operating system running on the mobile device, and the like. In some embodiments, the conditions can involve determining (by the app on the mobile device) if the interaction matches a specific type of interaction. For example, a condition can be specify that for successful validation a swipe right interaction is to occur on a first visually illustrative scene. In other words, only a right swipe will cause the first visually illustrative scene to change into a second visually illustrative scene. Thus, in such a scenario, other types of interactions will not cause the first visually illustrative scene to change into a second visually illustrative scene.

Conditions associated with validation of electronic tickets can, for example, be communicated by a remote ticketing server to the app running on the mobile device. The ticketing server can communicate the conditions at the time a user is purchasing and/or redeeming an electronic ticket. In some embodiments, new conditions can be added or previously transmitted conditions can be updated at any time, i.e., regardless of the time when the user is purchasing and/or redeeming an electronic ticket. Additionally, in some embodiments, these conditions can be specified by a service provider associated with the ticket.

Based on the interaction satisfying certain conditions, a second visually illustrative scene is presented on the display screen of a mobile device, at step 430. Subsequently, in some embodiments, the mobile app displays (at step 434) a message on the screen of a mobile device indicating that validation is successful. The process ends thereafter.

Figure 5:
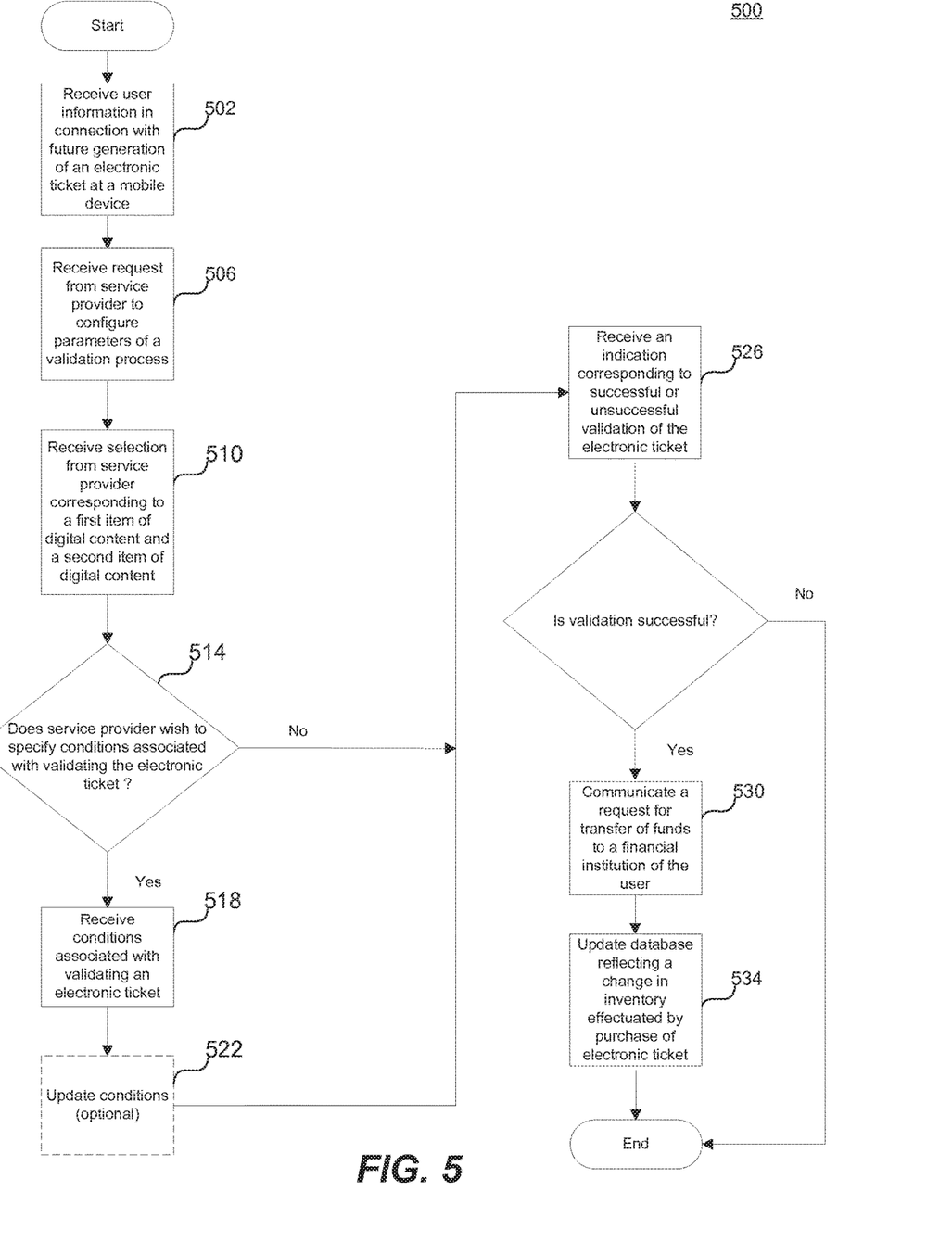
FIG. 5 illustrates a flow diagram showing method steps by a ticketing server for validation of electronic tickets, according to an embodiment of the present invention.

FIG. 5 illustrates a flowchart showing method steps 500 implemented by a ticket validation server (e.g., ticketing server 130) for validation of electronic tickets, according to an embodiment of the present invention. At step 502, a ticketing server 130 (i.e., server component) receives user information in connection with a future validation of one or more electronic tickets. Such information can include, for example, an ID of a user, an ID of the mobile device, one or more credit/debit card numbers associated with a financial institution of the user for billing purposes, a phone number, and an email address. Next, at step 506, a ticketing server 130 receives a request from a service provider 110 to configure one or parameters/conditions of a validation process. It will be understood that in some embodiments the parameters/conditions of a validation process are ticket-specific, i.e., they apply to one particular instance of an electronic ticket. In some embodiments, the parameters/conditions of a validation process apply to a batch of tickets.

At step 510, a ticketing server 130 receives selections from a service provider 110 corresponding to a first item of digital content and a second item of digital content. For instance, a service provider can select from available digital content, or upload/submit digital content to be used as a part of a validation process. Next, at step 514, a ticketing server 130 determines whether or not a service provider wishes to specify conditions associated with validating an electronic ticket. As discussed previously, in some embodiments, successful validation depends on whether certain conditions are satisfied. These conditions can be associated with a context such as a time of the day, a day of the week, a location of the mobile device, a type of a mobile device, an operating system running on the mobile device, and the like. In some embodiments, the conditions can involve determining (by the app on the mobile device) if the interaction matches a specific type of interaction. For example, a condition can be specify that for successful validation a swipe right interaction is to occur on a first visually illustrative scene. In other words, only a right swipe will cause the first visually illustrative scene to change into a second visually illustrative scene. Thus, in such a scenario, other types of interactions will not cause the first visually illustrative scene to change into a second visually illustrative scene. Additionally, in some embodiments, a service provider 110 might wish to specify a location wherein interaction is supposed to occur with a first visually illustrative scene, with respect to the screen of a user's mobile device. For example, a service provider 110 can define a criterion (to be used as part of a validation process) that the interaction is a single long press and with a chimney located within a 200 pixel by 200 pixel display area in the top right corner of a screen of a mobile device.

Accordingly, at step 518, the mobile app receives conditions and/or criteria associated with validating an electronic ticket from a service provider 110. Further, optionally, in some embodiments, new conditions can be added or previously transmitted conditions can be updated at any time, i.e., regardless of the time when the user is purchasing and/or redeeming an electronic ticket. Additionally, in some embodiments, updates to conditions and/or criteria can be specified by a service provider 110 associated with the ticket. This optional step is shown as a box bounded by dotted lines, as step 522.

Either subsequent to, or during the time, a mobile ticket undergoes a validation process, a ticketing server 130 gets a message (e.g., a confirmation) indicating whether or not the validation was successful. This is represented as step 526 in the flowchart. Thus, if the validation is not successful, the process ends. However, if the validation is successful, then in some embodiments, the ticketing server 130 communicates (at step 530) a request for transfer of funds to a financial institution of the user, as a result of the purchase of the electronic ticket. Also, in some embodiments, the ticketing server 130 updates a database reflecting a change in inventory effectuated by purchase of the electronic ticket. The process ends thereafter.

As another embodiment of the disclosure, the ticket being validated on a mobile device can be analyzed by an inspection device, rather than being viewed by a person (e.g., a ticket taker). This allows for agencies to avoid having ticket takers memorize arbitrary interactions (or sets of interactions), but rather have them available for inspection at the time they are needed. Accordingly, one or more interactions (or, even interaction sets defining particular sequence of interactions) for a given ticket can be communicated to an inspection device. As an example, an inspection device can include an inspector app running on a ticket taker's mobile device.

As yet another embodiment, it may also be possible in systems with network capabilities for an inspector app to communicate interactions or interaction sets (also referred to herein as gesture interaction sets) to a user's device. This will allow for two devices to act together for validation rather than necessitating all ticket information be known before hand on the ticket holder's device. For example, Iwo mobile devices with NFC capabilities can exchange information that includes such interactions or interaction sets. In one instance, for example, a NFC capable mobile device operated by a ticket taker can send conditions and/or criteria to be used as part of a validation process, to a user's mobile device. In another instance, a mobile device operated by a ticket taker receive information corresponding to whether a validation process is successful or not. Subsequently, in some embodiments, a ticket taker's mobile device can inform a ticketing server 130 (server component) corresponding to whether a validation process is successful or not. Thus, in embodiments of the present disclosure, a ticketing server 130 (server component) can receive information about a validation process exclusively from a user's mobile device, or from a ticket taker's mobile device, or jointly from both the ticket taker and the user.

Figure 6A:
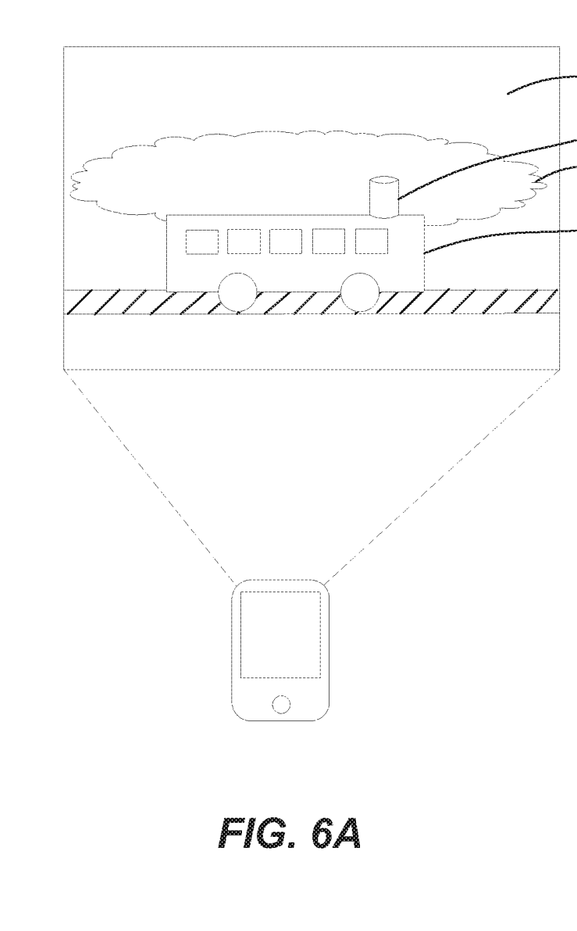
FIG. 6A and FIG. 6B show exemplary first and second visually scenes on an interactive display screen.
Figure 6B:
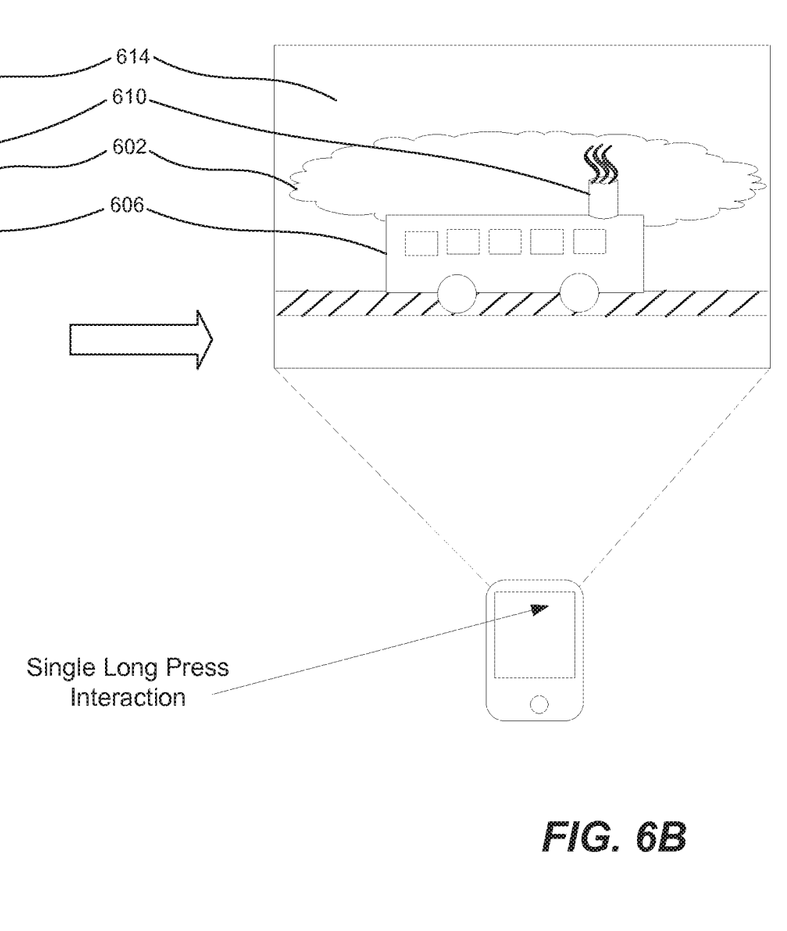

FIG. 6A and FIG. 6B show an exemplary first and an exemplary second visually illustrative scene on an interactive display screen. Specifically, an exemplary validation process is shown in which a first visually illustrative scene (in FIG. 6A) changes to a second visually illustrative scene (FIG. 6B) upon interaction (e.g., a single long press interaction) by a user or a ticket taker. Both the first and the second scenes include four exemplary sprites. A first sprite 602 illustrates clouds, a second sprite 606 illustrates a train, a third sprite 610 illustrates a chimney on a train, and a fourth sprite 614 illustrates a sky in the background. After the mobile device has started displaying a scene, a user or a ticket taker can interact with the scene. Thus, for example, if a user or a ticket taker interacts with the non-smoking chimney in FIG. 6A via a single long press, then the display changes into FIG. 6B wherein smoke is shown to emit from the chimney. Thus, a mobile app running on the user's mobile device is configured to detect dynamic interaction of an item of digital content (e.g., the first visually illustrative scene shown in FIG. 6A) with the ticket taker or the user. If smoke is not emitted when the single long press interaction is applied and/or it does not stop emitting when the single long press interaction is removed, the ticket taker will deem the ticket to be invalid.

As described previously, in some embodiments, conditions defining which combination of interaction and ticket to use (as part of a validation process) are communicated to the mobile device. Hence, conditions define how interaction is supposed to occur with an item of digital content, during a validation process. In other words, conditions can specify a context associated with an electronic ticket. For example, a condition can specify: "If the day is a Thursday, and the time is between 12 noon and 3 pm, an electronic ticket is associated with a scene that shows a moving train." Further, the condition can specify: "Upon a single long press interaction with the portion of the screen that shows the chimney on the moving train, smoke should emit from the chimney. If the single long press interaction is removed, smoke should stop emitting from the chimney on the train."

Referring to the example above, if a mobile ticket is being attempted to validate on a Thursday, the ticket taker should expect a single long press interaction would apply for validating a ticket, and further applying said interaction will cause smoke to emit from the chimney on the train. Accordingly, if on a Thursday, the ticket-taker applies a single long press on a touch screen of a mobile device, at the portion of the mobile device screen wherein the chimney is viewable, he or she should expect to see smoke to emit. Also, the smoke would stop emitting when the long press interaction is removed. If on a Thursday, the smoke does not emit when the single long press interaction is applied and/or stop emitting when the single long press interaction is removed, the ticket taker will deem the ticket to be invalid.

Additionally, a condition for successful validation of an electronic ticket can also specify a pre-determined location of interaction on the first visually illustrative scene with respect to the display screen. Thus, in connection with FIG. 6A, a condition can define that for successful validation, an interaction is supposed to be a single long press with a chimney located within a 200 pixel by 200 pixel display area in the top right corner of a screen of a mobile device. If an interaction occurs with the first visually illustrative scene at other locations (besides the chimney or outside 200 pixel by 200 pixel area), then in some embodiments, a second visually illustrative scene is not displayed. In other embodiments, a mobile app may display an error message indicating unsuccessful validation.

In some embodiments, an interaction (e.g., a swipe down, a long press, etc.) may not have any effect when applied on one sprite but may have an effect on another sprite. Thus, a tap may not have an effect on a train sprite but a tap might cause the cloud sprite to shower rain drops. Thus, embodiments of the present disclosure allow conditions to be defined based on arbitrary combinations of gestures as applied to sprites.

In addition to simple gestures as described exemplarily in connection with FIG. 6A and FIG. 6B, more involved interactions may be utilized for performing validation. In this way, a ticket taker can engage in a more involved interaction with a scene. This involved interaction can include, for example, a plurality of gestures applied to an item of digital content in a particular sequence. In some embodiments, if the particular sequence is not detected (by the mobile app running on the user's mobile device), validation is unsuccessful. For purposes of discussion, a particular sequence of interactions is referred to as an "interaction set." In accordance with embodiments of the present disclosure, an interaction set is defined as a set of gesture/animation pair that applies to a sprite (or, more generally, a scene). An interaction set can be associated with one or more sprites. In an exemplary scenario (not shown in the accompanying drawings), two exemplary interaction sets can be defined with reference to scenes involving train sprites:

Set A

1) Single Longpress—causes a train sprite to change into a paddle sprite, further spawning a ball, followed by a subsequent 2) Single touch—causes a paddle sprite to move back and forth to hit the ball Set B 1) Double tap on the train—causes a train sprite to be converted into a sprite that represents a turret 2) Subsequent taps—Launch missiles as if in response to firing command Thus, ticket validation approaches that utilize involved or complex interactions (e.g., defined by interaction sets) are similar to "gamification," i.e., an activity similar to playing traditional games. As will be understood and appreciated, these elaborate, or otherwise, involved interactions serve as further validation that the electronic ticket is authentic. These interaction sets can be applied to a sprite or a scene at any time and therefore serve as part of the validation procedure. For example, the mobile device can be configured to utilize Interaction Set A on certain days of the week (e.g., Monday, Tuesday, and Wednesday) and interaction Set B on the other days of the week. Thus, interaction sets and/or animations can be associated with predefined time schedules.

In exemplary embodiments, neither the first visually illustrative scene nor the second visually illustrative scene is required to include animations. However, in some embodiments, the first visually illustrative scene and/or the second visually illustrative scene may include animations. For example, in connection with FIG. 6A and FIG. 6B, the cloud sprite can be made to move toward the left of the scene in order to simulate the train moving to the right.

In accordance with embodiments of the present disclosure, a ticket designer or a system administrator (affiliated with ticketing server 130 or service provider 110) accesses an embodiment of ticketing server 130 via a web interface for designing an electronic ticket and/or specifying conditions associated with a validation process. Towards that end, such a web interface, for example, can prompt him or her to select between pre-defined interaction sets, or to dynamically create an interaction set, and then assign/associate the interaction sets with an electronic ticket. For instance, when an electronic ticket is being designed, conditions can be associated with gestures, a context of operation of the mobile device (e.g., a time of the day, a day of the week, etc.) and/or conditions that can be otherwise associated with specific animations.

In this disclosure, numerous specific details have been set forth in order to provide a thorough understanding of embodiments of the present disclosure. It will be apparent, however, to one skilled in the art that embodiments of the present disclosure may be practiced without some of these specific details.

Embodiments of the present disclosure include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware. As will be understood, the steps of the processes shown in FIGS. 2, 3, 4, and 5 are not necessarily completed in the order shown, and various steps may operate concurrently and continuously. It will be understood that the drawings and discussions herein refer to two items of digital content, i.e. a first item and a second item. But such drawings and discussions are for exemplary purposes only. In alternate embodiments, multiple (e.g., more than two) items of digital content can be used as a part of a validation process.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMS), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments of the present disclosure may also be downloaded as a computer program product or data to be used by a computer program product, wherein the program, data, and/or instructions may be transferred from a remote computer to a requesting computer by way of data signals embodied in a carrier wave or other propagation medium via a communication link (e.g., a modem or network connection).

What is claimed is:

1. In an electronic ticketing system, a method of validating an electronic ticket on a mobile device, the method comprising:
   receiving a request to validate an electronic ticket;
   upon receiving the validation request,
      receiving, via a ticket validator device, data corresponding to a pre-determined gesture to be performed to validate a ticket,
      rendering a first visually illustrative scene on an interactive display screen of the mobile device, the visually illustrative scene responsive to a pre-determined gesture to be performed at a predetermined location on the interactive display screen as a condition, and
      extracting interaction information data indicative of interaction between an operator of the mobile device and the first visually illustrative scene; and
   in response to determining that the extracted interaction information data corresponds to the data for the pre-determined gesture to be performed at the predetermined location, rendering a second visually illustrative scene on the interactive display screen of the mobile device to visually indicate that the electronic ticket is valid.

2. The method of claim 1, wherein the context associated with the gesture is selected from one or more of the following: a time of the day, a day of the week, a location of the mobile device, a type of a mobile device, an operating system running on the mobile device.

3. The method of claim 1, wherein the extracted interaction information data is compared with information data in a gesture interaction set pertaining to a pre-determined location of interaction on the first visually illustrative scene with respect to the display screen, to determine whether it corresponds with the pre-determined gesture.

4. The method of claim 3, wherein the gesture interaction set defines validating gestures, which vary according to one or more of a time of the day or day of the week.

5. The method of claim 1, wherein the mobile device transmits an indication back to the ticket validation device when the extracted interaction information data corresponds with the pre-determined gesture to validate the electronic ticket.

6. The method of claim 5, wherein the mobile device communicates via NFC to the ticket validation device.

7. The method of claim 1, further comprising: upon determining that the extracted interaction information matches with the predetermined gesture, rendering a message on the display screen indicating that validation is successful.

8. The method of claim 1, wherein the extracted interaction information comprises biometric information to be compared with the pre-determined gesture for a match, indicating that the electronic ticket is valid.

9. The method of claim 1, further comprising: in response to determining that the extracted interaction information does not match with the pre-determined gesture to be performed at the predetermined location, rendering a message on the display screen indicating that validation was unsuccessful.

10. The method of claim 1, wherein the first visually illustrative scene is responsive to a plurality of pre-determined gestures, and the second visually illustrative scene is rendered only upon determining that the extracted interaction information matches with the plurality of pre-determined gestures.

11. The method of claim 1, wherein the pre-determined gesture to be performed is at least one of the following: a tap, a double tap, a press, a scroll, a pinch, a swipe.

12. The method of claim 1, wherein the pre-determined gesture to be performed requires a finger swipe on the interactive display screen.

13. The method of claim 1, further comprising: receiving data corresponding to the pre-determined gesture to be performed via NFC from a ticket validator mobile device upon receiving the request to validate an electronic ticket.

14. In an electronic ticketing system, a mobile device having one or more processors configured to:
   receive a request to validate an electronic ticket;
   upon receiving the validation request,
      receive, via a ticket validator device, data corresponding to a pre-determined gesture to be performed to validate a ticket,
      render a first visually illustrative scene on an interactive display screen of the mobile device, the visually illustrative scene responsive to a pre-determined gesture to be performed at a predetermined location on the interactive display screen as a condition, and
      extract interaction information data indicative of interaction between an operator of the mobile device and the first visually illustrative scene; and
   in response to determining that the extracted interaction information data corresponds to the data for the pre-determined gesture to be performed at the predetermined location, render a second visually illustrative scene on the interactive display screen of the mobile device to visually indicate that the electronic ticket is valid.

15. The electronic ticketing system of claim 14, wherein the context associated with the gesture is selected from one or more of the following: a time of the day, a day of the week, a location of the mobile device, a type of a mobile device, an operating system running on the mobile device.

16. The electronic ticketing system of claim 14, wherein the extracted interaction information data is compared with information data in a gesture interaction set pertaining to a pre-determined location of interaction on the first visually illustrative scene with respect to the display screen, to determine whether it corresponds with the pre-determined gesture.

17. The electronic ticketing system of claim 16, wherein the gesture interaction set defines validating gestures, which vary according to one or more of a time of the day or day of the week.

18. The electronic ticketing system of claim 14, wherein the mobile device transmits an indication back to the ticket validation device when the extracted interaction information data corresponds with the pre-determined gesture to validate the electronic ticket.

19. The electronic ticketing system of claim 18, wherein the mobile device is further configured to communicate via NFC to the ticket validation device.

20. The electronic ticketing system of claim 14, further comprising: upon determining that the extracted interaction information matches with the predetermined gesture, render a message on the display screen indicating that validation is successful.

21. The electronic ticketing system of claim 14, wherein the extracted interaction information comprises biometric information to be compared with the pre-determined gesture for a match, indicating that the electronic ticket is valid.

22. The electronic ticketing system of claim 14, further comprising: receive data corresponding to the pre-determined gesture to be performed via NFC from a ticket validator mobile device upon receiving the request to validate an electronic ticket.

\* \* \* \* \*